(12) United States Patent
Simpson

(10) Patent No.: US 10,279,921 B2
(45) Date of Patent: May 7, 2019

(54) CRYOGENIC TANK

(71) Applicant: General Electric Company, Schenectady, NY (US)

(72) Inventor: James Edward Simpson, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 1523 days.

(21) Appl. No.: 13/665,901

(22) Filed: Oct. 31, 2012

(65) Prior Publication Data

US 2014/0117163 A1   May 1, 2014

(51) Int. Cl.
  *F17C 3/00* (2006.01)
  *B64D 37/06* (2006.01)
  (Continued)

(52) U.S. Cl.
  CPC ............ *B64D 37/06* (2013.01); *B64D 37/30* (2013.01); *F17C 1/14* (2013.01);
  (Continued)

(58) Field of Classification Search
  CPC . B64D 37/06; B64D 37/30; F17C 1/14; F17C 2223/0161; F17C 2223/033; F17C 2223/035; F17C 2201/0152; F17C 2201/054; F17C 2203/013; F17C 2203/0325; F17C 2203/0329; F17C 2203/035; F17C 2203/0383; F17C 2203/0391; F17C 2203/0629;
  (Continued)

(56) References Cited

U.S. PATENT DOCUMENTS 3,314,567 A * 4/1967 Becker .................... B63B 25/12
                                                    114/74 A
3,454,245 A * 7/1969 Hannagan .............. B64D 25/14
                                                    182/48

(Continued)

OTHER PUBLICATIONS

Chambellan, Rene E., Structural Feasibility Study of Pressurized Tanks for Liquid-Methane Fueled Supersonic Aircraft, NASA Technical Note NASA TN D-4295, Dec. 1967. 1-49.

*Primary Examiner* — Fenn C Mathew
*Assistant Examiner* — Elizabeth J Volz
(74) *Attorney, Agent, or Firm* — GE Global Patent Operation; John Darling

(57) ABSTRACT

A cryogenic tank includes a shell having an interior side, an exterior side, and an internal volume that is bounded by the interior side. The shell has a shape that includes at least two elongated lobes that are defined by partial cylinders that intersect each other. The partial cylinders extend lengths along central longitudinal axes that are offset from each other. The lobes include opposite domes that extend at opposite ends of the length of the corresponding partial cylinder. The cryogenic tank includes an internal reinforcement frame having a web of elongate frame members extending within the internal volume. The frame members extend along the interior side of the shell such that lengths of the frame members extend along paths that follow the profile of the interior side of the shell. The internal reinforcement frame is configured to distribute loads exerted on the shell along at least three different directions.

22 Claims, 8 Drawing Sheets

(51) Int. Cl.
*F17C 1/14* (2006.01)
*B64D 37/30* (2006.01)

(52) U.S. Cl.
CPC .......... *F17C 2201/0152* (2013.01); *F17C 2201/054* (2013.01); *F17C 2203/013* (2013.01); *F17C 2203/035* (2013.01); *F17C 2203/0325* (2013.01); *F17C 2203/0329* (2013.01); *F17C 2203/0383* (2013.01); *F17C 2203/0391* (2013.01); *F17C 2203/0629* (2013.01); *F17C 2203/0636* (2013.01); *F17C 2203/0646* (2013.01); *F17C 2203/0648* (2013.01); *F17C 2205/018* (2013.01); *F17C 2221/033* (2013.01); *F17C 2223/0161* (2013.01); *F17C 2223/033* (2013.01); *F17C 2223/035* (2013.01); *F17C 2260/011* (2013.01); *F17C 2270/0189* (2013.01)

(58) Field of Classification Search
CPC ........ F17C 2203/0636; F17C 2205/018; F17C 2221/033; F17C 2260/011; F17C 2270/0189; B65D 88/14
USPC .............. 220/560.04, 560.09, 560.11, 562; 244/118.1, 135 R
See application file for complete search history.

(56) References Cited

U.S. PATENT DOCUMENTS

| | | | |
|---|---|---|---|
| 4,459,929 | A | 7/1984 | Ffooks |
| 4,860,545 | A * | 8/1989 | Zwick et al. .................. 62/50.6 |
| 4,946,056 | A | 8/1990 | Stannard |
| 5,012,948 | A | 5/1991 | Van Den Bergh |
| 5,651,474 | A * | 7/1997 | Callaghan et al. ........... 220/565 |
| 6,123,295 | A | 9/2000 | Wexler et al. |
| 6,334,589 | B1 | 1/2002 | Kirn et al. |
| 6,422,514 | B1 | 7/2002 | Clark et al. |
| 6,503,584 | B1 | 1/2003 | McAlister |
| 6,536,090 | B1 | 3/2003 | Franklin, III et al. |
| 7,775,391 | B2 | 8/2010 | Harper |
| 2013/0186059 | A1* | 7/2013 | Epstein et al. .................. 60/205 |

\* cited by examiner

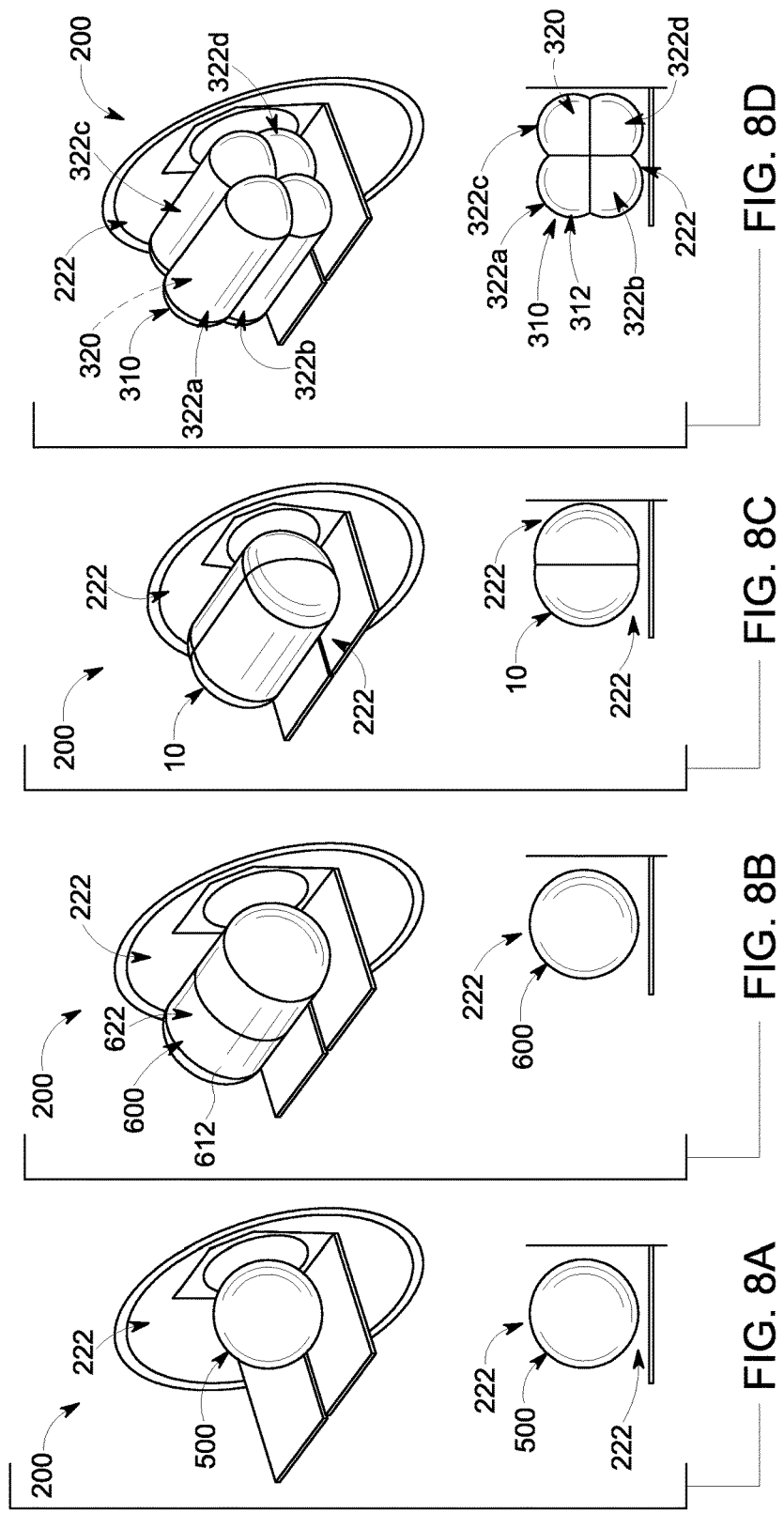

CRYOGENIC TANK

BACKGROUND

Cryogenic fluids are sometimes used on-board aircraft. For example, some aircraft engines are configured to use natural gas as fuel. The natural gas is stored on-board the aircraft as liquid natural gas (LNG), which is a cryogenic fluid. Cryogenic fluids are stored on-board aircraft within a cryogenic tank that holds a volume of the cryogenic fluid. Various loads may be exerted on the cryogenic tank during operation of the aircraft. For example, cryogenic fluids may be stored at elevated pressure relative to the surroundings, resulting in a pressure load on the tank. Various additional loads may be exerted on a cryogenic tank during flight operations of the aircraft as the aircraft maneuvers (e.g., turns, dives, climbs, accelerates, and/or the like) through an airspace. Moreover, various loads may be exerted on a cryogenic tank during emergency takeoffs and during emergency landings of the aircraft, for example due to the relatively large accelerations and/or decelerations and/or rates of climb and/or descent during such operations. Such loads arising from the different accelerations that objects onboard aircraft can experience during flight operations are sometimes referred to as "inertia loads".

Many known cryogenic tanks cannot withstand the inertia loads experienced during operation of the aircraft without rupturing and/or becoming dislodged within the aircraft. Cryogenic fluid may leak and/or spill out of a ruptured cryogenic tank, which may cause damage to the aircraft and/or injury to one or more persons on-board the aircraft. Moreover, a cryogenic tank that has become dislodged may cause impact damage to the aircraft and/or impact injury to one or more persons on-board the aircraft. At least some known cryogenic tanks are more structurally robust and therefore may be capable of withstanding the inertia loads experienced during flight operations. But, such cryogenic tanks are too heavy and/or are not volumetrically efficient.

BRIEF DESCRIPTION

In one embodiment, a cryogenic tank is provided for containing a cryogenic fluid therein. The cryogenic tank includes a shell having an interior side, an exterior side, and an internal volume that is bounded by the interior side. The shell is configured to contain the cryogenic fluid within the internal volume. The shell has a shape that includes at least two elongated lobes that are defined by partial cylinders that intersect each other. The partial cylinders of the at least two lobes extend lengths along central longitudinal axes that are offset from each other. The at least two lobes include opposite domes that extend at opposite ends of the length of the corresponding partial cylinder. The cryogenic tank also includes an internal reinforcement frame having a web of elongate frame members that extend within the internal volume of the shell. The frame members extend along the interior side of the shell such that lengths of the frame members extend along paths that follow the profile of the interior side of the shell. The internal reinforcement frame is configured to distribute loads exerted on the shell along at least three different directions.

In another embodiment, an aircraft includes an airframe, and a cryogenic tank on-board the airframe for containing a cryogenic fluid. The cryogenic tank includes a shell having an interior side, an exterior side, and an internal volume that is bounded by the interior side. The shell is configured to contain the cryogenic fluid within the internal volume. The shell has a shape that includes at least two elongated lobes that are defined by partial cylinders that intersect each other. The partial cylinders of the at least two lobes extend lengths along central longitudinal axes that are offset from each other. The at least two lobes include opposite domes that extend at opposite ends of the length of the corresponding partial cylinder. The cryogenic tank includes an internal reinforcement frame having a web of elongate frame members that extend within the internal volume of the shell. The frame members extend along the interior side of the shell such that lengths of the frame members extend along paths that follow the profile of the interior side of the shell. The internal reinforcement frame is configured to distribute loads exerted on the shell along at least three different directions.

In another embodiment, a cryogenic tank is provided for containing a cryogenic fluid therein. The cryogenic tank includes a shell having an interior side, an exterior side, and an internal volume that is bounded by the interior side. The shell is configured to contain the cryogenic fluid within the internal volume. The shell has a shape that includes at least two elongated lobes that are defined by partial cylinders that intersect each other. The partial cylinders of the at least two lobes extend lengths along central longitudinal axes that are offset from each other. The at least two lobes include opposite domes that extend at opposite ends of the length of the corresponding partial cylinder. The cryogenic tank also includes an internal reinforcement frame having a web of elongate frame members that extend within the internal volume of the shell. The frame members extend along the interior side of the shell such that lengths of the frame members extend along paths that follow the profile of the interior side of the shell. The internal reinforcement frame is configured to provide the shell with the capability of withstanding an inertia load arising from an acceleration with a magnitude of nine times gravitational acceleration without rupturing.

BRIEF DESCRIPTION OF THE DRAWINGS

FIG. 8 illustrates various exemplary embodiments of cryogenic tanks.

DETAILED DESCRIPTION

Figure 1:
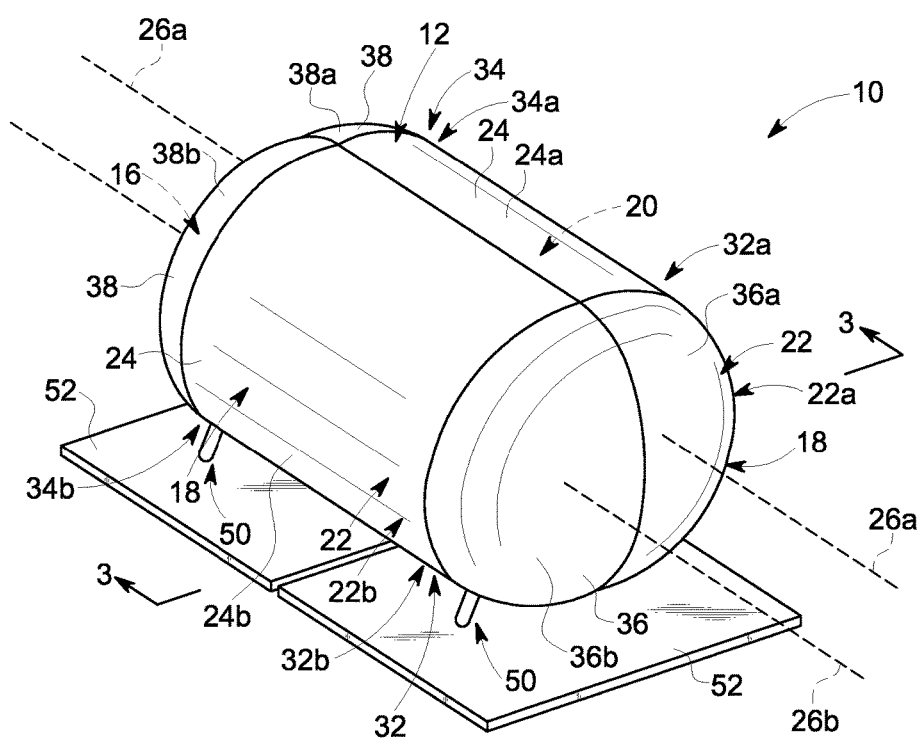
FIG. 1 is perspective view of an exemplary embodiment of a cryogenic tank for containing a cryogenic fluid therein.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of cryogenic tanks are provided for containing a cryogenic fluid (e.g., liquid natural gas (LNG)), for example on-board an aircraft. At least one technical effect of various embodiments is a cryogenic tank that is relatively lightweight, relatively volume efficient, and structurally robust to loads encountered during operation of an aircraft. For example, the various embodiments described and/or illustrated herein may provide a cryogenic tank that is relatively lightweight, relatively volume efficient, and capable of withstanding inertia loads up to or greater than a predetermined value without rupturing and/or becoming dislodged within the aircraft. Moreover, and for example, at least one technical effect of various embodiments is increasing the volume efficiency of a cryogenic tank that is structurally robust to loads encountered during operation of an aircraft. At least one technical effect of various embodiments is, for example, increasing the mass efficiency of a cryogenic tank that is structurally robust to loads encountered during operation of an aircraft. Further, at least one technical effect of various embodiments is a cryogenic tank that is more volume efficient than spherical or cylindrical cryogenic tanks. At least one other technical effect of various embodiments includes enabling an aircraft to carry a fewer number of fuel tanks for a given total amount of fuel carried by the aircraft.

As used herein, the phrase "mass efficiency" is defined as the volume capacity of the internal volume divided by the overall weight of a cryogenic tank. As used herein, the phrase "volume efficiency" is defined as the volume capacity of the internal volume of a cryogenic tank divided by the amount that a space containing the cryogenic tank is filled by the cryogenic tank.

Figure 2:
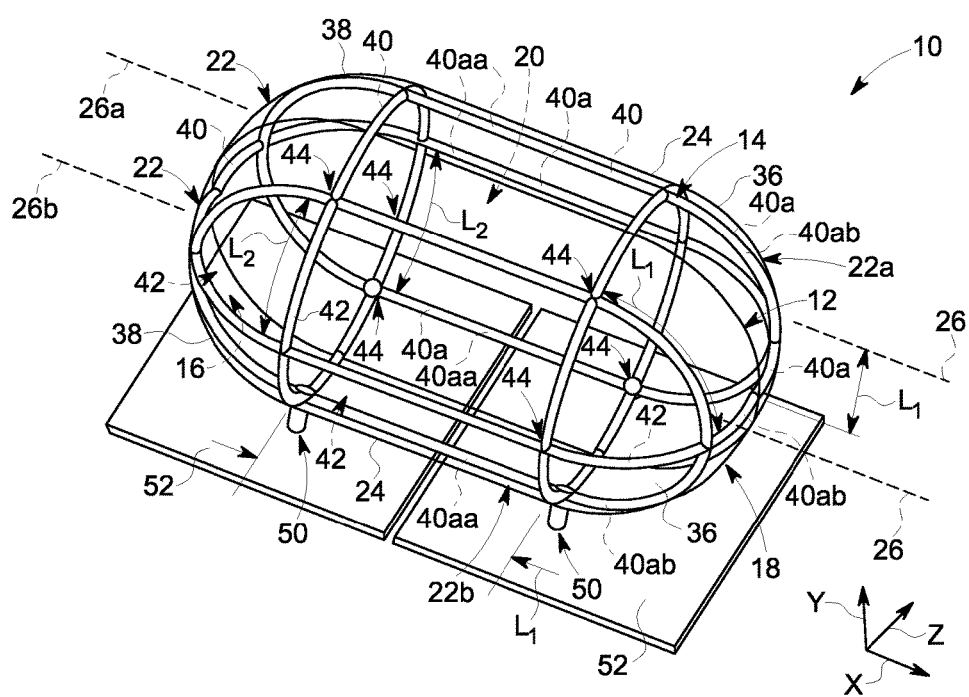
FIG. 2 is a perspective view of the cryogenic tank shown in FIG. 1 illustrating an exemplary embodiment of an internal reinforcement frame of the cryogenic tank.

FIGS. 1 and 2 are perspective views of an exemplary embodiment of a cryogenic tank 10. The cryogenic tank 10 is used to contain a cryogenic fluid. The cryogenic fluid contained by the cryogenic tank 10 may be any type of cryogenic fluid (which maybe contained within the cryogenic tank 10 in liquid and/or gaseous form), such as, xbut not limited to, LNG and/or the like. LNG has a temperature of approximately 111 K and may be considered cryogenic. In some embodiments, the cryogenic tank 10 is a fuel tank on-board an aircraft (e.g., the aircraft 200 shown in FIGS. 5 and 6) for containing LNG or another cryogenic fluid that is used as fuel for an engine of the aircraft.

The cryogenic tank 10 includes a shell 12 and an internal reinforcement frame 14 (not visible in FIG. 1). The shell 12 includes an interior side 16 and an exterior side 18 that is opposite the interior side 16. The shell 12 defines an internal volume 20 that is bounded by the interior side 16 of the shell 18. The shell 12 is configured to contain the cryogenic fluid within the internal volume 20. In other words, the shell 12 defines a closed container that is configured to hold the cryogenic fluid therein. In some embodiments, the shell 12 defines a pressure vessel that is configured to hold the cryogenic fluid therein at a pressure that is different than ambient (e.g., atmospheric) pressure.

In the exemplary embodiment of the cryogenic tank 10, the shell 12 has a multi-lobe shape. Specifically, the shape of the shell 12 includes at least two lobes 22. In the exemplary embodiment of the cryogenic tank 10, the shell 12 includes only two lobes 22a and 22b, which are each elongate. But, the shell 12 may include any number of lobes 22. For example, FIG. 8d illustrates a cryogenic tank 310 having a shell 312 that includes four lobes 322a-d. Moreover, and for example, in some alternative embodiments, the shell 12 includes only a single lobe 22 such that the shell 12 has the shape of a cylinder (with a dome, an approximately planar structure, or another structure that closes off the ends of the cylinder). For example, FIG. 8b illustrates a cryogenic tank 600 having a shell 612 that includes a single lobe 622 in the shape of a cylinder. Referring again to the cryogenic tank 10, the number of lobes 22 may be selected to provide the cryogenic tank 10 with a predetermined volume efficiency, with a predetermined volume capacity of the internal volume 20, with a predetermined mass efficiency, and/or with a predetermined external size and/or shape (e.g., to increase the amount of an irregular space that is filled by the cryogenic tank 10).

Figure 3:
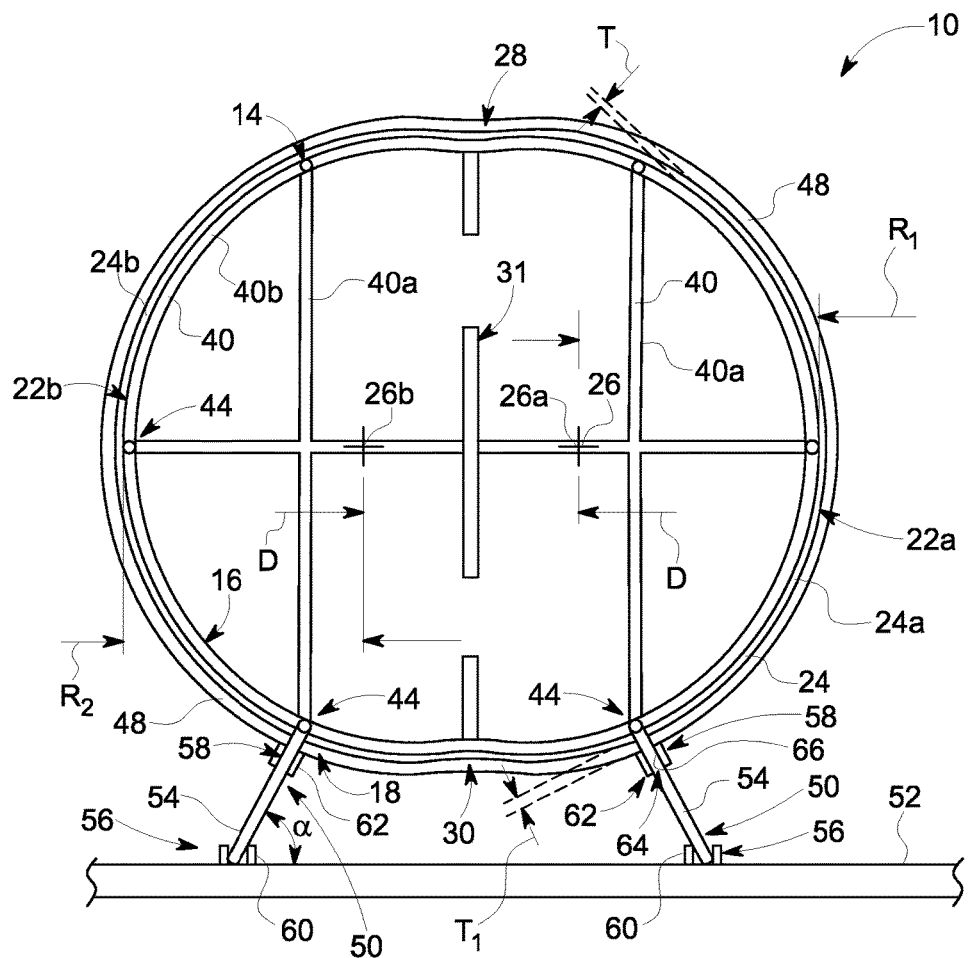
FIG. 3 is a cross-sectional view of the cryogenic tank shown in FIG. 1 taken along line 3-3 of FIG. 1.

FIG. 3 is a cross-sectional view of the cryogenic tank 10 taken along line 3-3 of FIG. 1. Referring now to FIGS. 1 and 3, each lobe 22 is defined by a partial cylinder 24 that extends a length along a central longitudinal axis 26 and intersects the partial cylinder 24 of one or more other lobes 22. By "partial cylinder", it is meant that the circumference of the partial cylinder 24 does not form a closed circle (i.e., is not continuous). In the exemplary embodiment of the cryogenic tank 10, the lobes 22a and 22b are defined by respective partial cylinders 24a and 24b that intersect each other and that extend lengths along respective central longitudinal axes 26a and 26b.

To define the shell with the shape having the lobes 22, the central longitudinal axes 26a and 26b of the partial cylinders 24a and 24b, respectively, are offset from each other by a distance D (not labeled in FIG. 1) that is less than the combined value of the radii $R_1$ and $R_2$ (not labeled in FIG. 1) of the respective partial cylinders 24a and 24b. Accordingly, the partial cylinders 24a and 24b intersect each other at two points 28 and 30 of intersection. The circumferences of the partial cylinders 24a and 24b end (i.e., are cut off) at the points of intersection 28 and 30 such that the circumferences do not form closed circles. Optionally, one or more internal bulkheads 31 (not shown in FIG. 1) extend across the internal volume 20 of the shell 12 between the lobes 22. The exemplary bulkhead 31 shown in FIG. 3 extends between the intersection points 28 and 30 to provide support for the shell 12 between the intersection points 28 and 30. But, in addition or alternative to the bulkhead 31, the cryogenic tank 10 may include one or more other internal bulkheads (not shown) that extend across the internal volume 20 between other locations along the circumferences of the partial cylinders 24. Bulkhead 31, any additional bulkheads, and/or any alternative bulkheads may take the form of a plate, a perforated plate, a series of tie-rods, any other form of structural member, and/or the like.

In the exemplary embodiment of the cryogenic tank 10, the radius $R_1$ of the partial cylinder 24a has approximately the same value as the radius $R_2$ of the partial cylinder 24b. In some other embodiments, the radius $R_1$ of the partial cylinder 24a has a different value than the radius $R_2$ of the partial cylinder 24b, for example to increase the amount of an irregular space that is filled by the cryogenic tank 10. The central longitudinal axes 26a and 26b of the partial cylinders 24a and 24b, respectively, may be offset from each other by a distance D having any value that is less than the combined value of the radii $R_1$ and $R_2$ of the partial cylinders 24a and 24b, respectively. The distance D, the radius $R_1$, and/or the radius $R_2$ may be selected to provide the cryogenic tank 10 with a predetermined volume efficiency, with a predetermined volume capacity of the internal volume 20, with a predetermined mass efficiency, and/or with a predetermined external size and/or shape (e.g., to increase the amount of an irregular space that is filled by the cryogenic tank 10).

Referring now solely to FIG. 1, the length of each of the partial cylinders 24 extends from an end 32 to an opposite end 34. Specifically, the partial cylinder 24a of the lobe 22a extends the length from an end 32a to an opposite end 34a, while the partial cylinder 24b of the lobe 22b extends from an end 32b to an opposite end 34b. In the exemplary embodiment of the cryogenic tank 10, each lobe 22 includes a dome 36 that extends at the end 32 of the partial cylinder 24 and an opposite dome 38 that extends at the end 34. The geometry of each of the domes 36 and 38 may be, but is not limited to, hemispherical, torispherical, semi-ellipsoidal, and/or the like. Specifically, the lobe 22a includes domes 36a and 38a that extend at the ends 32a and 34a, respectively, of the partial cylinder 24a, and the lobe 22b includes domes 36b and 38b that extend at the respective ends 32b and 34b of the partial cylinder 24b. The domes 36 and 38 close off the respective ends 32 and 34 of the partial cylinder 24 of the corresponding lobe 22. In alternative to the dome 36 and/or 38, the end 32 and/or 34 of the partial cylinder 24 of one or more of the lobes 22 may have an approximately planar or other shaped structure that closes off the end 32 and/or 34.

The shell 12 of the cryogenic tank 10 may be fabricated from any materials, such as, but not limited to, aluminum alloys, magnesium alloys, titanium alloys, a carbon fiber reinforced polymer, an aluminum lithium alloy, and/or the like. The shell 12 may have any thickness T (shown in FIG. 3), such as, but not limited to, greater than approximately 0.04 inches, between approximately 0.04 inches and approximately 0.06 inches, between approximately 0.04 inches and approximately 1.0 inch, greater than approximately 0.06 inches, and/or the like. The material(s) used to fabricate the shell 12 and/or the thickness T of the shell 12 may be selected to provide the cryogenic tank 10 with a predetermined mass efficiency and/or may be selected to provide the cryogenic tank 10 with a relatively light weight while also being relatively structurally robust. For example, the material(s) used to fabricate the shell 12 and/or the thickness T of the shell 12 may be selected to provide the cryogenic tank 10 with the lightest weight that still enables the shell 12 and the various other components of the cryogenic tank 10 to be structurally robust to loads encountered on-board an aircraft during operation of the aircraft, for example flight operations, emergency landing operations, and emergency takeoff operations.

Referring now solely to FIG. 2, as described above, the shell 12 includes an internal reinforcement frame 14. The reinforcement frame 14 extends within the internal volume 20 of the shell 12 and includes a web of elongate frame members 40 that extend along the interior side 16 of the shell 12. As will be described in more detail below, each of the frame members 40 of the reinforcement frame 14 extends a length that extends along a path that follows the profile of the interior side 16 of the shell 12. As will also be described in more detail below, the reinforcement frame 14 is configured to reinforce the shell 12 by distributing loads exerted on the shell 12 along three orthogonal directions (e.g., the x, y, and z axes of a Cartesian coordinate system). In some embodiments, one or more of the frame members 40 is directly and/or indirectly attached to the interior side 16 of the shell 12 for supporting the shell 12.

The frame members 40 of the reinforcement frame 14 include longitudinal frame members 40a and latitudinal frame members 40b. As can be seen in FIG. 2, the lengths $L_1$ of the longitudinal frame members 40a extend along the central longitudinal axes 26 of the partial cylinders 24 of the lobes 22, while the lengths $L_2$ of the latitudinal frame members 40b peripherally surround the central longitudinal axes 26 of the partial cylinders 24. Specifically, the longitudinal frame members 40a include longitudinal frame members 40aa that extend along the interior side 16 of the shell at the partial cylinders 24, and include longitudinal frame members 40ab that extend along the interior side 16 of the shell at corresponding domes 36 and 38. The lengths $L_1$ of the longitudinal frame members 40aa extend approximately parallel to the central longitudinal axes 26. The lengths $L_1$ of the longitudinal frame members 40ab extend along the central longitudinal axes 26, but the lengths $L_1$ of the longitudinal frame members 40ab are curved with respect to the central longitudinal axes 26. The lengths $L_2$ of the latitudinal frame members 40b peripherally surround the central longitudinal axes 26 at an approximately perpendicular angle relative to the central longitudinal axes 26. The longitudinal frame members 40aa may be referred to herein as "longitudinal cylinder frame members". The longitudinal frame members 40ab may be referred to herein as "dome frame members". The latitudinal frame members 40b may be referred to herein as "latitudinal cylinder frame members".

As briefly described above, each of the frame members 40 of the reinforcement frame 14 extends a length along a path that follows the profile of the interior side 16 of the shell 12. Specifically, as can be seen in FIG. 2, the length $L_1$ of each of the longitudinal frame members 40aa follows the approximately linear profile of the interior side 16 along the length of the corresponding partial cylinder 24. The length $L_1$ of each of the longitudinal frame members 40ab follows the curved profile of the interior side 16 along the corresponding dome 36 or 38. The length $L_2$ of each of the latitudinal frame members 40b follows the curved profile of the interior side 16 along the circumference of the corresponding partial cylinder 24.

FIG. 2 illustrates the arrangement of the frame members 40 of the reinforcement frame 14 in a web pattern wherein each frame member 40 is interconnected with, and extends between, two other frame members 40, and wherein web openings 42 are defined between the frame members 40. The reinforcement frame 14 thus forms a pattern of structural webbing on the interior side 16 of the shell 12. In the exemplary embodiment of the reinforcement frame 14, the frame members 40 intersect each other at approximately perpendicular joints 44. Specifically, the longitudinal frame members 40a intersect the latitudinal frame members 40b at the approximately perpendicular joints 44. In the exemplary embodiment of the reinforcement frame 14, the web openings 42 have approximately square shapes because each of the joints 44 is approximately perpendicular. The frame members 40 are directly or indirectly attached to each other at the joints 44 using any suitable attachment structure and/or means, such as, but not limited to, by welding, using an adhesive, by being integrally formed together (e.g., the joint 44 is formed by bending, the joint is formed by casting 44, and/or the like), and/or the like.

In some other embodiments, the longitudinal frame members 40a and the latitudinal frame members 40b overlap each other (whether or not the longitudinal frame members 40a and the latitudinal frame members 40b are more than merely engaged at the points of overlap). Moreover, although shown as having a circular cross-sectional shape, one or more of the frame members 40 may alternatively have a different cross-sectional shape, such as, but not limited to, an I-beam, a rectangular cross-sectional shape, a square cross-sectional shape, an oval cross-sectional shape, an octagonal cross-sectional shape, a triangular cross-sectional shape, and/or the like. Each of the frame members 40 may be hollow or solid along the length thereof. It should be understood that the reinforcement frame 14 may include a combination of hollow and solid frame members 40.

As should be apparent from FIG. 2 and the description of the reinforcement frame 14, the pattern of the web of the reinforcement frame 14 is determined, at least in part, by the lengths $L_1$ and $L_2$ of each longitudinal frame member 40a and each latitudinal frame member 40b, respectively, the number of frame members 40 provided, the spacing between frame members 40 (i.e. the size of the web openings 42), the angle(s) of the joints 44, the shape(s) of the web openings 42, and/or the like. The pattern of the web of the reinforcement frame 14 is not limited to the pattern shown in FIGS. 2 and 3. Rather, the web of the reinforcement frame 14 may have any other pattern that enables the reinforcement frame 14 to function as described and/or illustrated herein.

For example, the longitudinal frame members 40a and latitudinal frame members 40b are not limited to intersecting or overlapping each other at the approximately perpendicular joints 44. Rather, each joint 44 between a longitudinal frame member 40a and a latitudinal frame member 40b may have any angle. For example, one or more joints 44 may have an acute or an obtuse angle. Moreover, and for example, different joints 44 may have different angles. The longitudinal frame members 40a and the latitudinal frame members 40b are not limited to the orientations shown and described herein. Rather, the length $L_1$ of one or more of the longitudinal frame members 40aa may be oriented at a non-perpendicular angle relative to the central longitudinal axes 26, the length $L_1$ of one or more of the longitudinal frame members 40ab may be aligned with the central longitudinal axes 26 at a non-perpendicular angle, and/or the length $L_2$ of one or more of the latitudinal frame members 40b may peripherally surround the central longitudinal axes 26 at a non-perpendicular angle relative to the central longitudinal axes 26. Different longitudinal frame members 40aa may have different orientations, different longitudinal frame members 40ab may have different orientations, and/or different latitudinal frame members 40b may have different orientations.

Moreover, each of the longitudinal frame members 40a and each of the latitudinal frame members 40b may have any respective length $L_1$ and $L_2$. For example, different longitudinal frame members 40a may have different lengths $L_1$ and/or different latitudinal frame members 40b may have different lengths $L_2$. Similarly, the web openings 42 are not limited to the sizes or the approximately square shapes shown herein. Rather, each web opening 42 may have any size and may have any shape. Examples of shapes of the web openings 42 include, but are not limited to, rectangular shapes, square shapes, triangular shapes, irregular shapes, shapes having more than four sides, and/or the like. It should be understood that different web openings 42 may have different shapes and/or different sizes.

As described above, in some embodiments, one or more of the frame members 40 is directly and/or indirectly attached to the interior side 16 of the shell 12 for supporting the shell 12. In some other embodiments, the frame members 40 of the reinforcement frame 14 are not attached to the interior side 16 of the shell 12 such that the reinforcement frame 14 is configured to float within the internal volume 20 of the shell 12. By "directly attached", it is meant a structure is attached to another structure without any intervening attachment member (e.g., an intervening connector, fastener, threaded fastener, clamp, tie, shim, damper, cushion, and/or the like) and such that the structures are engaged (i.e., in physical contact) with each other. By "indirectly attached", it is meant a structure is attached to another structure with an intervening attachment member extending therebetween such that the structures do not engage each other. In other words, a structure is considered to be directly attached to another structure when the structures are engaged with each other, whether or not the structures are held in engagement using an attachment member (and whether or not the attachment member extends between portions of the structures). For example, a structure is considered to be directly attached to another structure when the structures are welded together, brazed together, or are attached together using an adhesive that chemically bonds with the structures because the weld, braze, and chemical bond effectively engages the structures together. Moreover, and for example, a structure is considered to be indirectly attached to another structure when the structures are attached together using an adhesive that mechanically bonds to the structures instead of chemically bonding with the structures. Other examples of indirect attachment of a structure to another structure include using an intervening connector, fastener, threaded fastener, shim, clamp, tie, damper, cushion, and/or the like that attach the structures together such that the structures do not engage each other.

The frame members 40 of the reinforcement frame 14 may be directly or indirectly attached to the interior side 16 of the shell 12 at any locations along the frame members 40. For example, the frame members 40 may be directly or indirectly attached to interior side 16 at one or more of the joints 44, at one or more locations along the lengths $L_1$ of the longitudinal frame members 40a, and/or at one or more locations along the lengths $L_2$ of the latitudinal frame members 40b. The frame members 40 of the reinforcement frame 14 may be directly or indirectly attached to the interior side 16 of the shell 12 using any suitable method, means, structure, attachment member, and/or the like, such as, but not limited to, welding, brazing, an adhesive, a connector, a fastener, a threaded fastener, a clamp, a tie, a shim, a damper, a cushion, and/or the like. In the exemplary embodiment of the reinforcement frame 14, the frame members 40 are directly attached to the interior side 16 of the shell 12 by being welded to the interior side 16. Specifically, the frame members 40 are welded to the interior side 16 at the joints 44, the longitudinal frame members 40a are welded to the interior side 16 at various locations along the lengths $L_1$ thereof, and the latitudinal frame members 40b are welded to the interior side 16 at various locations along the lengths $L_2$ thereof.

The reinforcement frame 14 may be directly or indirectly attached to one or more internal bulkheads (e.g., the internal bulkhead 31 shown in FIG. 3) of the cryogenic tank 10. For example, the frame members 40 may be directly or indirectly attached to the internal bulkhead(s) at one or more of the joints 44, at one or more locations along the lengths $L_1$ of the longitudinal frame members 40a, at one or more locations along the lengths $L_2$ of the latitudinal frame members 40b, and/or at one or more joints 46 between longitudinal frame members 40a. The reinforcement frame 14 may be directly or indirectly attached to the internal bulkhead(s) using any suitable method, means, structure, attachment member, and/or the like, such as, but not limited to, welding, brazing, an adhesive, a connector, a fastener, a threaded fastener, a clamp, a tie, a shim, a damper, a cushion, and/or the like.

Referring again to FIG. 3, the cryogenic tank 10 may be thermally insulated and/or provided with a cooling system (not shown) to facilitate maintaining the cryogenic fluid contained within the internal volume 20 below a predetermined temperature. For example, the cryogenic tank 10 may be thermally insulated to facilitate maintaining the cryogenic fluid in a liquid state within the internal volume 20. In the exemplary embodiment of the cryogenic tank 10, a thermal insulation layer 48 surrounds at least a portion of the exterior side 18 of the shell 12. The thermal insulation layer 48 is not shown in FIG. 1 or 2. The thermal insulation layer 48 may be fabricated from any materials, structure, and/or the like that enables the thermal insulation layer 48 to thermally insulate the internal volume 20, such as, but not limited to, pipe insulation, mineral wool, glass wool, an elastomeric foam, a rigid foam, polyethylene, aerogel, a wall that at least partially surrounds the shell 12 with air or a vacuum extending between the shell 12 and the wall, and/or the like.

The thermal insulation layer 48 may have any thickness $T_1$, such as, but not limited to, greater than approximately 1.0 inches, between approximately 1.0 inches and approximately 7.0 inches, between approximately 2.0 inches and approximately 6.0 inches, greater than approximately 1.0 inches, and/or the like. The material(s) used to fabricate the thermal insulation layer 48 and/or the thickness $T_1$ of the thermal insulation layer 48 may be selected to provide the cryogenic tank 10 with a predetermined mass efficiency and/or may be selected to provide the cryogenic tank 10 with a relatively light weight while also being relatively structurally robust. For example, the material(s) used to fabricate the thermal insulation layer 48 and/or the thickness $T_1$ of the thermal insulation layer 48 may be selected to provide the cryogenic tank 10 with the lightest weight that still enables the cryogenic tank 10 to be structurally robust to loads encountered on-board an aircraft during operation of the aircraft, for example flight operations, emergency landing operations, and emergency takeoff operations.

The cryogenic tank 10 includes one or more support feet 50 that extend outward on the exterior side 18 of the shell 12. The support feet 50 can also be seen in FIGS. 1 and 2. The support feet 50 are configured to connect the cryogenic tank 10 to a support surface 52, such as, but not limited to, one or more pallets (e.g., the pallets 254 shown in FIGS. 5 and 6), the fuselage 214 of an aircraft (e.g., the aircraft 200 shown in FIGS. 5-7), a floor, the ground, a platform, a concrete patch, an asphalt patch, and/or the like.

Each support foot 50 may include any structure, geometry, and/or the like that enables the support foot 50 to support the cryogenic tank 10 as described and/or illustrated herein. In the exemplary embodiment of the cryogenic tank 10, each support foot 50 is an elongate strut 54 having a circular cross-sectional shape. The strut 54 extends a length from a support end 56 to an opposite tank end 58. The support end 56 is configured to engage the support surface 52 and/or an optional receiving structure 60 (e.g., a fixture, a connector, a base, a receptacle, and/or the like) that is mounted to and/or rests on the support surface 52. The support end 56 may include an end cap and/or other structure (not shown) that engages the support surface 52 and/or the receiving structure 60.

The tank end 58 of the strut 54 is configured to engage the cryogenic tank 10 such that the support foot 50 supports the cryogenic tank 10 on the support surface 52. Specifically, the tank end 58 of the strut 54 is indirectly or directly attached to the shell 12, the internal reinforcement frame 14, and/or one or more internal bulkheads (e.g., the internal bulkhead 31) of the cryogenic tank 10 to support the cryogenic tank 10. The tank end 58 may be directly attached to the reinforcement frame 14, may be indirectly attached to the reinforcement frame 14 through one or more intervening structures (e.g., the shell 12, the thermal insulation layer 48, a fixture, and/or the like), may be directly attached to the shell 12, may be indirectly attached to the shell 12 through one or more intervening structures (e.g., the thermal insulation layer 48, a fixture, and/or the like), may be directly attached to one or more internal bulkheads, and/or may be indirectly attached to one or more internal bulkheads through one or more intervening structures. The tank end 58 of the strut 54 may be aligned with the reinforcement frame 14 (e.g., with one or more joints 44 and/or with one or more of the frame members 40 along the length thereof), and/or may be aligned with one or more internal bulkheads of the cryogenic tank 10. Alignment of the tank end 58 of the strut 54 with the reinforcement frame 14 and/or with one or more internal bulkheads of the cryogenic tank 10 may facilitate the transfer of loads from the reinforcement frame 14 and/or the bulkhead(s) to the support feet 50, and vice versa In the exemplary embodiment of the cryogenic tank 10, a fixture 62 is mounted to the exterior side 18 of the shell 12. The fixture 62 includes a socket 64 having an opening 66. The tank end 58 of the strut 58 is received within the socket 64 such that the tank end 58 extends through the opening 66, through the thermal insulation layer 48 (if included), and through the shell 12. The tank end 58 is directly attached (e.g., welded and/or the like) to the reinforcement frame 14 at a corresponding one of the joints 44. The alignment between the tank end 58 and the corresponding joint 44 enables the strut 54 to provide support to the reinforcement frame 14 at the joint 44. Moreover, the alignment and direct attachment between the tank end 58 and the joint 44 facilitates the transfer of loads from the reinforcement frame 14 to the strut 54, and vice versa.

In addition or alternatively to the circular cross-sectional shape described above, each strut 54 of the support feet 48 may have any other cross-sectional shape, such as, but not limited to, an octagonal cross-sectional shape, a rectangular cross-sectional shape, a square cross-sectional shape, an oval cross-sectional shape, a triangular cross-sectional shape, and/or the like. Each of the struts 54 may be hollow or solid along the length thereof. Each support strut 54 may have any length. Although the lengths of the struts 54 are shown as extending at an acute angle α relative to the support surface 52, the length of each strut 54 may extend at any other angle relative to the support surface 52, such as, but not limited to, an approximately perpendicular angle, an obtuse angle, a different acute angle, and/or the like. The cryogenic tank 10 may include any number of support feet 50.

The struts 54 and the other various components of the support feet 50 may be fabricated from any materials, such as, but not limited to, aluminum alloys, magnesium alloys, titanium alloys, a carbon fiber reinforced polymer, an aluminum lithium alloy, and/or the like. Each support strut 54 may have any length and any width (e.g., diameter). The material(s) used to fabricate the support feet 50, the length of the struts 54, the width of the struts 54, and/or the like may be selected to provide the cryogenic tank 10 with a predetermined mass efficiency. Moreover, various parameters of the support feet 50 (e.g., the material(s) used to fabricate the support feet 50, the length of the struts 54, the width of the struts 54, the angle α of the struts 54, and/or the manner in which the support struts 54 are engaged with, indirectly attached to, and/or directly attached to the cryogenic tank 10 and/or the support surface 52) may be selected to provide the cryogenic tank 10 with a relatively light weight while also being relatively structurally robust. For example, the various parameters of the support feet 50 may be selected to provide the cryogenic tank 10 with the lightest weight that still enables the cryogenic tank 10 to remain structurally robust to loads encountered on-board an aircraft during operation of the aircraft, for example flight operations, emergency landing operations, and emergency takeoff operations. Specifically, and for example, the various parameters of the support feet 50 may be selected to enable the cryogenic tank 10 to withstand inertia up to or greater than a predetermined value without dislodging from the support surface 52. The cryogenic tank 10 may dislodge from the support surface due to one or more of the struts 54 failing, one or more of the struts 54 becoming disengaged and/or detached from the support surface 52, and/or the like.

Referring now to FIGS. 2 and 3, as briefly described above, the internal reinforcement frame 14 is configured to reinforce the shell 12 by distributing loads exerted on the shell 12 along three orthogonal directions. For example, a Cartesian coordinate system having x, y, and z axes is shown in FIG. 2. Various loads may be exerted on the shell 12, for example while the shell 12 holds a volume of cryogenic fluid and/or during operation of a mobile platform (e.g., an aircraft and/or the like) on which the cryogenic tank 10 is on-board. For example, the inertia of the mass of the cryogenic fluid contained within the internal volume 20 exerts inertia loads on the shell 12. Moreover, and for example, movement of a mobile platform on which the cryogenic tank 10 is on-board will result in inertia loads being exerted on the shell 12.

The inertia loads exerted on the shell 12 are distributed along the web pattern of the reinforcement frame 14. Specifically, the inertia loads exerted on the shell 12 are distributed along the paths of the lengths $L_1$ and $L_2$ of the frame members 40 of the reinforcement frame 14. The inertia loads exerted on the shell 12 are thereby distributed along the x, y, and z directions of the Cartesian coordinate system. Accordingly, instead of being localized at a region or point of the shell 12, the inertia loads exerted on the shell 12 by the cryogenic fluid are spread out along the pattern of the reinforcement frame 14. The distribution of the inertia loads by the reinforcement frame 14 may prevent the shell 12 from rupturing when the inertia loads are exerted thereon, which may prevent the cryogenic fluid from spilling out of the cryogenic tank 10. For example, the distribution of the inertia loads by the reinforcement frame 14 may prevent the shell 12 from rupturing when experiencing pressure induced by inertia loading of up to or greater than approximately 50 pounds per square inch. Moreover, and for example, the distribution of the inertia by the reinforcement frame 14 may prevent the shell 12 from rupturing when experiencing inertia loads resulting from accelerations up to or greater than approximately nine times gravitational acceleration.

In embodiments wherein the reinforcement frame 14 is aligned with (e.g., attached to) the support feet 50, the inertia loads exerted on the shell 12 are distributed by the reinforcement frame 14 to the support feet 50, and ultimately to the support surface 52 that supports the cryogenic tank 10. Such distribution of loads to the internal bulkhead(s), the support feet 50, and/or the support surface 52 may provide the shell 12 with the capability of withstanding greater inertia loads without rupturing.

The pattern of the web of the reinforcement frame 14 may be selected to prevent the shell 12 from rupturing when experiencing inertia loads up to or greater than a predetermined value. Moreover, the pattern of the web of the reinforcement frame 14 may be selected to provide the cryogenic tank 10 with a predetermined mass efficiency and/or may be selected to provide the cryogenic tank 10 with a relatively light weight while also being relatively structurally robust. For example, the pattern of the web of the reinforcement frame 14 may be selected to provide the cryogenic tank 10 with the lightest weight that still enables the shell 12 and the various other components of the cryogenic tank 10 to be structurally robust to loads encountered on-board an aircraft during operation of the aircraft, for example flight operations, emergency landing operations, and emergency takeoff operations. Although the web structure of the reinforcement frame 14 is shown as having a generally regular pattern, the web structure of the reinforcement frame 14 may additionally or alternatively include an irregular pattern.

Figure 4:
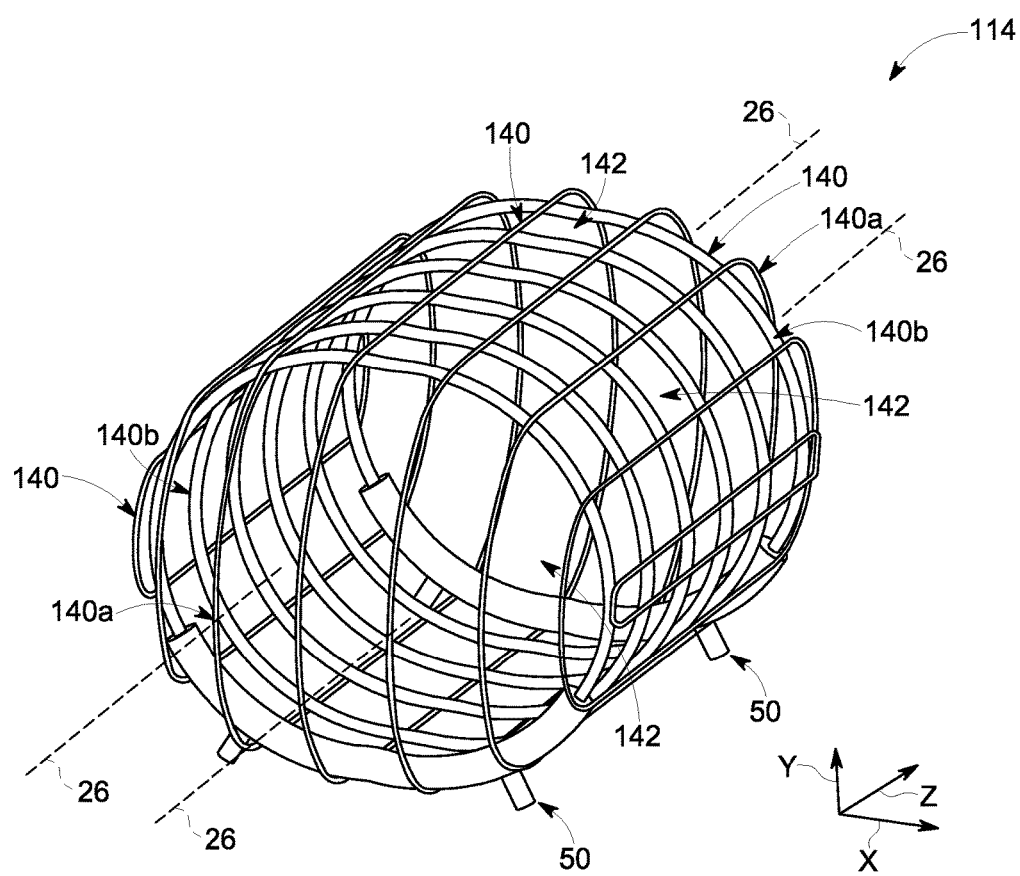
FIG. 4 is a perspective view of an exemplary alternative embodiment of a reinforcement frame of the cryogenic tank shown in FIGS. 1-3.

FIG. 4 is a perspective view of an exemplary alternative embodiment of a reinforcement frame 114 that may be used with the cryogenic tank 10 (shown in FIGS. 1-3) in place of the reinforcement frame 14 (shown in FIGS. 2 and 3). The reinforcement frame 114 extends within the internal volume 20 (shown in FIGS. 1-3) of the shell 12 (shown in FIGS. 1-3) and includes a web of elongate frame members 140 that extend along the interior side 16 (shown in FIGS. 1-3) of the shell 12. The shell 12 is not shown in FIG. 4 to better illustrate the reinforcement frame 114.

The frame members 140 of the reinforcement frame 114 include stringers 140*a* and formers 140*b*. Lengths of the stringers 140*a* extend along the central longitudinal axes 26 of the partial cylinders 24 (shown in FIGS. 1-3) of the lobes 22 (shown in FIGS. 1-3) of the shell 12. Lengths of the formers 140*b* peripherally surround the central longitudinal axes 26 of the partial cylinders 24. The lengths of the stringers 140*a* extend along the interior side 16 of the shell 12 at the partial cylinders 24 and at the domes 36 and 38 (shown in FIGS. 1-3).

Each of the frame members 140 of the reinforcement frame 114 extends a length along a path that follows the profile of the interior side 16 of the shell 12. Specifically, as should be apparent in FIG. 4, the length of each of the stringers 140*a* follows the approximately linear profile of the interior side 16 along the length of the corresponding partial cylinder 24 and follows the curved profile of the interior side 16 along the corresponding dome 36 or 38. The length of each of the formers 140*b* follows the curved profile of the interior side 16 along the circumference of the corresponding partial cylinder 24.

The frame members 140 of the reinforcement frame 114 are arranged in a web pattern wherein the stringers 140*a* and the formers 140*b* overlap each other with web openings 142 are defined between the frame members 140. The reinforcement frame 114 thus forms a pattern of structural webbing on the interior side 16 of the shell 12. Optionally, the stringers 140*a* and the formers 140*b* are directly or indirectly attached to each other at the points of overlap 144. The stringers 140*a* and the formers 140*b* may be directly or indirectly attached to each other using any suitable attachment structure and/or means, such as, but not limited to, by welding, using an adhesive, and/or the like.

As should be apparent from FIG. 4, the pattern of the web of the reinforcement frame 114 is determined, at least in part, by the lengths of each stringer 140a and each former 140b, the number of frame members 140 provided, the spacing between frame members 140 (i.e. the size of the web openings 142), the angle(s) of the points of overlap 144, the shape(s) of the web openings 142, and/or the like. The pattern of the web of the reinforcement frame 114 is not limited to the pattern shown in FIG. 4. Rather, the web of the reinforcement frame 114 may have any other pattern that enables the reinforcement frame 114 to function as described and/or illustrated herein.

For example, the stringers 140a and formers 140b are not limited to overlapping each other at the approximately perpendicular points of overlap 144 shown in FIG. 4. Rather, each point of overlap 144 may have any angle. The stringers 140a and the formers 140b are not limited to the orientations shown and described herein. Moreover, each of the stringers 140a and each of the formers 140b may have any length. The web openings 142 are not limited to the sizes or the approximately square shapes shown herein. Rather, each web opening 142 may have any size and may have any shape.

In some embodiments, one or more of the frame members 140 is directly and/or indirectly attached to the interior side 16 of the shell 12 for supporting the shell 12. In some other embodiments, the frame members 140 of the reinforcement frame 114 are not attached to the interior side 16 of the shell 12 such that the reinforcement frame 114 is configured to float within the internal volume 20 of the shell 12. The reinforcement frame 114 may be directly or indirectly attached to one or more internal bulkheads (e.g., the internal bulkhead 31 shown in FIG. 3) of the cryogenic tank 10.

The internal reinforcement frame 114 is configured to reinforce the shell 12 by distributing loads exerted on the shell 12 along three orthogonal directions. Inertia loads exerted on the shell 12 are distributed along the web pattern of the reinforcement frame 114. Specifically, the inertia loads exerted on the shell 12 are distributed along the paths of the lengths of the frame members 140 of the reinforcement frame 114. The inertia loads exerted on the shell 12 are thereby distributed along the x, y, and z directions of the Cartesian coordinate system. Accordingly, instead of being localized at a region or point of the shell 12, the inertia loads exerted on the shell 12 by the cryogenic fluid are spread out along the pattern of the reinforcement frame 114. The distribution of the inertia loads by the reinforcement frame 114 may prevent the shell 12 from rupturing when the inertia loads are exerted thereon, which may prevent the cryogenic fluid from spilling out of the cryogenic tank 10. For example, the distribution of the inertia loads by the reinforcement frame 114 may prevent the shell 12 from rupturing when experiencing pressure induced by inertia loading of up to or greater than approximately 50 pounds per square inch. Moreover, and for example, the distribution of the inertia by the reinforcement frame 114 may prevent the shell 12 from rupturing when experiencing inertia loads resulting from accelerations up to or greater than approximately nine times gravitational acceleration.

In embodiments wherein the reinforcement frame 114 is aligned with (e.g., attached to) the support feet 50, the inertia loads exerted on the shell 12 are distributed by the reinforcement frame 114 to the support feet 50, and ultimately to the support surface 52 (shown in FIGS. 1-3) that supports the cryogenic tank 10. Such distribution of loads to the internal bulkhead(s), the support feet 50, and/or the support surface 52 may provide the shell 12 with the capability of withstanding greater inertia loads without rupturing.

The pattern of the web of the reinforcement frame 114 may be selected to prevent the shell 12 from rupturing when experiencing inertia loads up to or greater than a predetermined amount. Moreover, the pattern of the web of the reinforcement frame 114 may be selected to provide the cryogenic tank 10 with a predetermined mass efficiency and/or may be selected to provide the cryogenic tank 10 with a relatively light weight while also being relatively structurally robust. For example, the pattern of the web of the reinforcement frame 114 may be selected to provide the cryogenic tank 10 with the lightest weight that still enables the shell 12 and the various other components of the cryogenic tank 10 to be structurally robust to loads encountered on-board an aircraft during operation of the aircraft, for example flight operations, emergency landing operations, and emergency takeoff operations. Although the web structure of the reinforcement frame 114 is shown as having a generally regular pattern, the web structure of the reinforcement frame 114 may additionally or alternatively include an irregular pattern.

Figure 5:
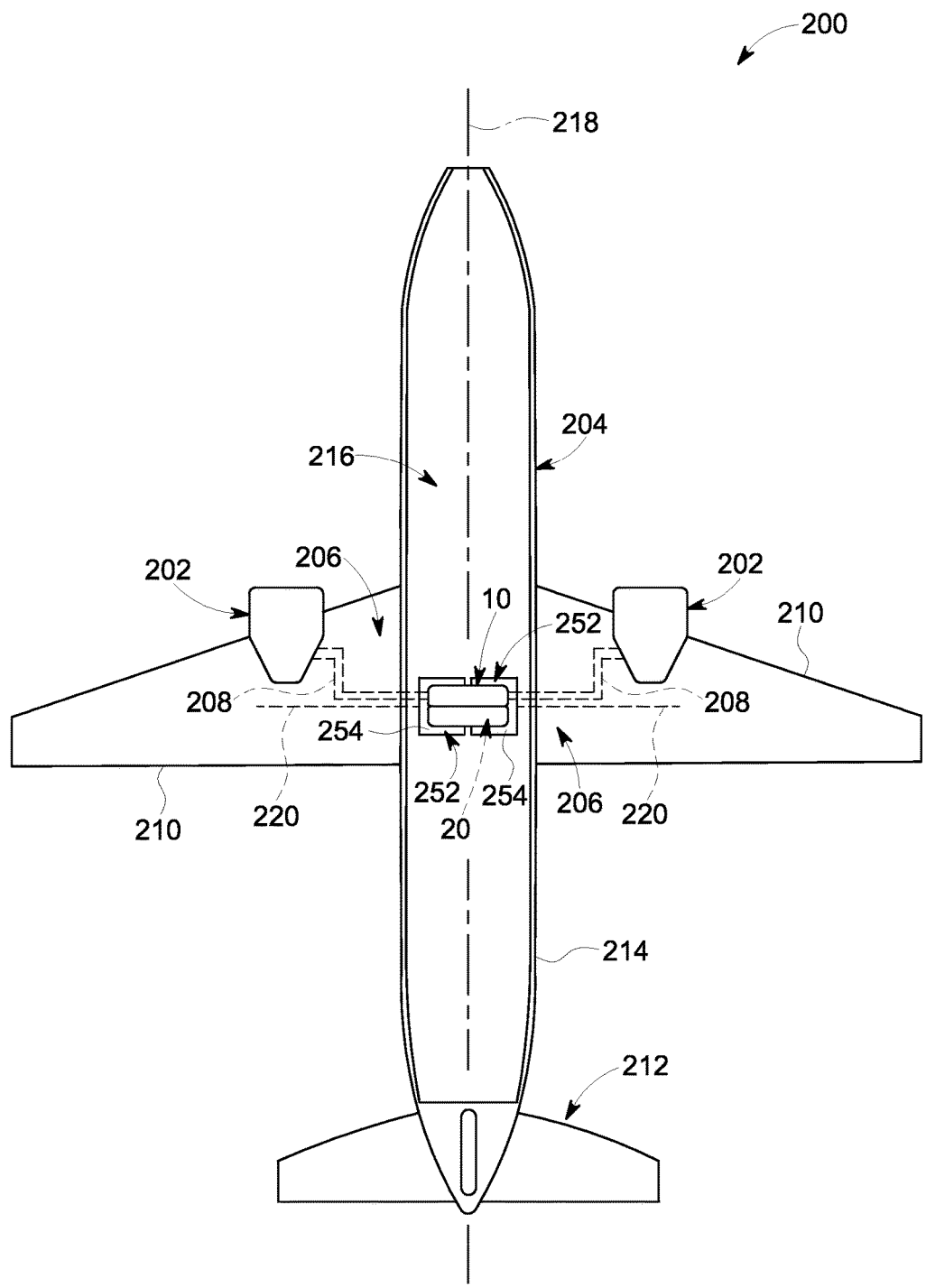
FIG. 5 is a schematic illustration of an embodiment of an aircraft.

As briefly discussed above, the cryogenic tank 10 may be located on-board an aircraft for containing fuel for an engine of the aircraft. For example, FIG. 5 is a schematic illustration of an exemplary embodiment of an aircraft 200 that includes one or more engines 202 that uses a cryogenic fluid as fuel. In the exemplary embodiment of the aircraft 200, the cryogenic fluid used as fuel for the engine 202 and contained by the cryogenic tank 10 on-board the aircraft 200 is LNG. But, the cryogenic fluid contained by the cryogenic tank 10 for use as fuel for the aircraft engine 202 may be any type of cryogenic fluid (which maybe contained within the cryogenic tank 10 in liquid and/or gaseous form) that is suitable for use as fuel for the aircraft engine 202. In the exemplary embodiment of the aircraft 200, the aircraft 200 is a fixed wing passenger airplane. For example, the aircraft 200 may be a KC-10 Extender manufactured by The Boeing Company.

The aircraft 200 includes an airframe 204 and a system 206, which includes the engine 202 and the cryogenic tank 10. The engine system 206, including the cryogenic tank 10, is located on-board the airframe 204. Specifically, the engine 202, the cryogenic tank 10, and various other components of the engine system 206 are positioned at various locations on and/or within the airframe 204 such that the engine 202, the cryogenic tank 10, and the various other components of the engine system 206 are carried by the airframe 204 during flight of the aircraft 200.

At least one of the engines 202 is operatively connected in fluid communication to receive cryogenic fluid from the cryogenic tank 10, for example through a fuel conduit 208. The engines 202 use the cryogenic fluid as fuel to generate thrust for generating and controlling flight of the aircraft 200. The engine system 206 may include one or more fuel pumps (not shown). Each fuel pump is operatively connected in fluid communication with the cryogenic tank 10 and with one or more corresponding engines 202 for pumping cryogenic fluid from the cryogenic tank 10 to the engine(s) 202. Each fuel pump may have any location along the airframe 204, such as, but not limited to, within the internal volume 20 of the cryogenic tank 10, mounted to a corresponding engine 202, located proximate a corresponding engine 202, and/or the like.

Each engine 202 may use any type(s) of fuel, individually or in any combination, such as, but not limited to, a petroleum-based fuel, hydrogen, natural gas, and/or the like. In the exemplary embodiment of the aircraft 200, the engines 202 are configured to use at least natural gas as fuel. In some other embodiments, the engines 202 are configured to use at least another cryogenic fluid as fuel. The cryogenic fluid pumped from the cryogenic tank 10 to the engines 202 may be supplied to the engines 202 in a gaseous form and/or as a liquid, no matter in which state(s) the cryogenic fluid is contained in the cryogenic tank 10. For example, in the exemplary embodiment of the aircraft 200, the engines 202 use the natural gas as fuel in the gaseous state. The engine system 206 may include one or more heating systems (not shown) that heat LNG stored by the cryogenic tank 10 to change the LNG stored by the cryogenic tank 10 to the gaseous state for supply to the engines 202 as fuel. In some other embodiments, one or more of the engines 202 is configured to use both natural gas and one or more other types of fuel, whether at the same and/or different times. Moreover, in some other embodiments, one or more of the engines 202 is not configured to use natural gas as a fuel. Accordingly, it should be understood that the aircraft 200 may include a fuel tank (not shown) that holds a different type of fuel than natural gas.

Each engine 202 may be any type of engine, such as, but not limited to, a turbine engine, an engine that drives a propeller or other rotor, a radial engine, a piston engine, a turboprop engine, a turbofan engine, and/or the like. Although two are shown, the aircraft 200 may include any number of the engines 202. Although shown located on wings 210 of the airframe 204, each engine 202 may have any other location along the airframe 204. For example, the aircraft 200 may include an engine 202 located at a tail 212 and/or another location along a fuselage 214 of the airframe 204.

The cryogenic tank 10 is supported on one or more support surfaces 252 of the aircraft 200. In the exemplary embodiment of the aircraft 200, the cryogenic tank 10 is supported on two pallets 254 that are loaded on-board the aircraft 200 and include the support surface 252. In some other embodiments, the cryogenic tank 10 is supported on a single pallet 254. The support feet 50 (FIGS. 1-3) of the cryogenic tank 10 are engaged with the support surface 252 of the corresponding pallet 254 and/or with an optional receiving structure (not shown, e.g., a fixture, a connector, a base, a receptacle, the fixture 60 shown in FIG. 3, and/or the like) that is mounted to and/or rests on the support surface 252 for supporting the cryogenic tank 10 on the pallets 254. The cryogenic tank 10 may be secured to the pallets 254 using any suitable attachment member, such as, but not limited to, straps, cables, chains, clamps, threaded fasteners, and/or the like). In some embodiments, the attachment member(s) used to secure the cryogenic tank 10 to the pallets 254 is selected such that the cryogenic tank 10 is configured to withstand up to or greater than an acceleration of approximately nine times gravitational acceleration without dislodging from the pallets 254. In some embodiments, the cryogenic tank 10 is connected directly to the fuselage 214 via support feet 50 and/or the like.

Figure 7:
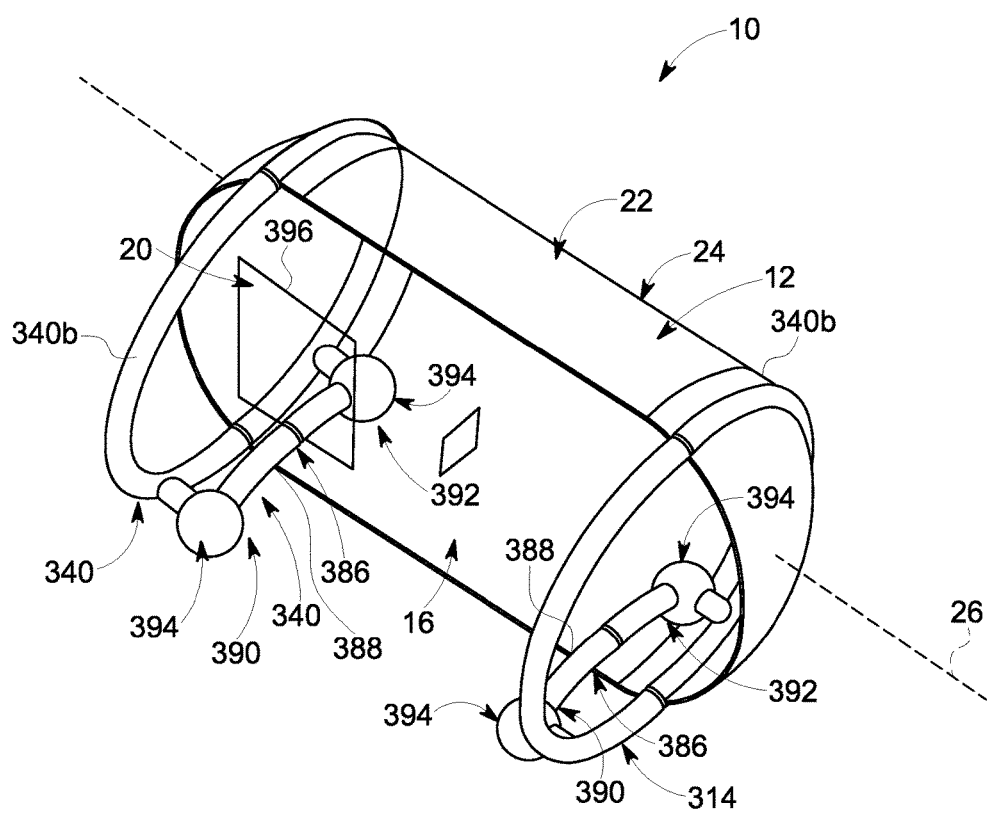
FIG. 7 is a perspective view of another exemplary alternative embodiment of a reinforcement frame of the cryogenic tank shown in FIGS. 1-3.

The cryogenic tank 10 includes the shell 12 and an internal reinforcement frame (not shown, e.g., the reinforcement frame 14 shown in FIGS. 2 and 3, the reinforcement frame 114 shown in FIG. 4, or the reinforcement frame 314 shown in FIG. 7). As described above, the reinforcement frame of the cryogenic tank 10 is configured to reinforce the shell 12 by distributing inertia loads exerted on the shell 12 along the web pattern of the reinforcement frame. Specifically, various inertia loads are exerted on the cryogenic tank 10 during operation of the aircraft 200. For example, various inertia loads are exerted on the cryogenic tank 10 during flight operations of the aircraft 200 as the aircraft maneuvers (e.g., turns, dives, climbs, accelerates, and/or the like) through an airspace. Moreover, and for example, various inertia loads are exerted on the cryogenic tank 10 during emergency takeoffs and during emergency landings of the aircraft 200, for example due to the relatively large accelerations, decelerations, rates of climb, and/or rates of descent, respectively, during such operations. The distribution of the inertia loads by the reinforcement frame of the cryogenic tank 10 may prevent the shell 12 from rupturing when the inertia loads are exerted thereon. For example, the distribution of the inertia loads by the reinforcement frame of the cryogenic tank 10 may prevent the shell 12 from rupturing when experiencing loads arising from an acceleration of up to approximately nine times gravitational acceleration (e.g., an approximately 9G forward load) experienced during a flight, emergency landing, or emergency takeoff operation. Moreover, and for example, the distribution of the inertia loads by the reinforcement frame of the cryogenic tank 10 may prevent the shell 12 from rupturing when experiencing inertia loads of up to or greater than approximately 50 pounds per square inch experienced during a flight, emergency landing, or emergency takeoff operation.

Figure 6:
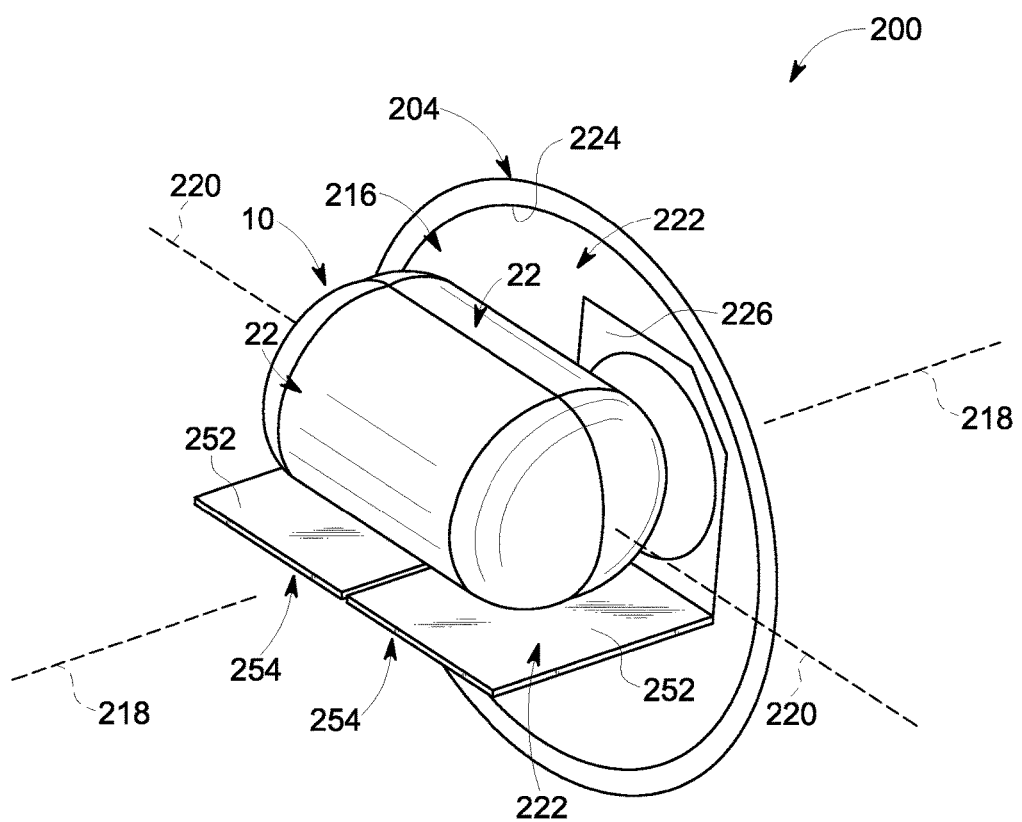
FIG. 6 is a perspective view of a portion of the aircraft shown in FIG. 5 illustrating an exemplary embodiment of an arrangement of the cryogenic tank 10 shown in FIGS. 1-3 within an exemplary cargo hold of the aircraft.

The cryogenic tank 10 may be located at any location on and/or within the airframe 204. In the exemplary embodiment of the aircraft 200, the pallets 254 and the cryogenic tank 10 supported thereon are located within a cargo hold 216 of the fuselage 214 of the airframe 204, as can be seen in FIG. 5. FIG. 6 is a perspective view of a portion of the aircraft 200 illustrating an exemplary embodiment of an arrangement of the cryogenic tank 10 and the pallets 254 within the cargo hold 216 of the aircraft 200. As should be apparent from FIGS. 5 and 6 and the description herein, the cryogenic tank 10 is not integral to the airframe 204 of the aircraft 200 because the cryogenic tank 10 is supported on the pallets 254, which are loaded on-board the airframe 204 rather than being integral to the airframe 204.

Referring now to FIGS. 5 and 6, the pallets 254 are arranged within the cargo hold 216 and the cryogenic tank 10 is supported by the pallets 254 such that the length of the cryogenic tank 10 extends transversely across the length of the cargo hold 216. Specifically, the airframe 204 and the cargo hold 216 of the aircraft 200 extend a length along a central longitudinal axis 218. The cryogenic tank 10 extends a length along a central longitudinal axis 220. The length of the cryogenic tank 10 extends transversely across the length of the cargo hold 216 such that the length of the cryogenic tank 10 extends along a width of the cargo hold 216. In other words, the central longitudinal axis 220 of the cryogenic tank 10 crosses over and extends non-parallel relative to the central longitudinal axis 218 of the cargo hold 216. In the exemplary embodiment of the aircraft 200, the central longitudinal axis 220 of the cryogenic tank 10 extends approximately perpendicular to the central longitudinal axis 218 of the cargo hold 216. But, in some other embodiments, the length of the cryogenic tank 10 extends transversely across the length of the cargo hold 216 such that the central longitudinal axis 220 extends obliquely to the central longitudinal axis 218. In still other embodiments, the cryogenic tank 10 is supported by the pallets 254 such that the lengths of the cryogenic tank 10 and the cargo hold 216 are approximately parallel (i.e., the central longitudinal axes 218 and 220 are approximately parallel).

Referring now solely to FIG. 6, the space 222 within the cargo hold 216 that contains the cryogenic tank 10 is irregular. Specifically, the irregular space 222 is bounded by the support surfaces 252 of the pallets 254 and a curved interior wall 224 of the cargo hold 216. The irregular space 222 may be further bounded by a vertical wall 224 of the cargo hold 216. Various parameters of the cryogenic tank 10 may be selected to enable the cryogenic tank 10 to more efficiently fill the irregular space 222. For example, a volume efficiency of the cryogenic tank 10 is defined as the volume capacity of the internal volume 20 of the cryogenic tank 10 divided by the amount of the irregular space 222 that is filled by the cryogenic tank 10. The number of lobes 22, the size of each lobe 22, the overall size of the cryogenic tank 10, the volume capacity of the internal volume 20, and/or the like may be selected to provide the cryogenic tank 10 with a predetermined volume efficiency. For example, the various parameters of the cryogenic tank 10 may be selected to increase the volume efficiency of the cryogenic tank 10. "Increase the volume efficiency" is intended to mean providing the internal volume 20 of the cryogenic tank with a greater volume capacity for a given sized and shaped irregular space 222. In other words, "increase the volume efficiency" is intended to mean increasing the amount of the irregular space 222 that is filled by the cryogenic tank 10 to thereby increase the amount of cryogenic fluid that can be contained by the cryogenic tank 10 within such a sized and shaped irregular space 222. The irregular space 222 is not limited to the specific size and/or shape shown herein. Rather, the various parameters of the cryogenic tank 10 may be selected to increase the volume efficiency of the cryogenic tank 10 with respect to irregular (or regular) spaces having any other size and/or shape.

Referring again to FIG. 5, the aircraft 200 may include any number of the cryogenic tanks 10, each of which may have any location along the airframe 204. Examples of other locations of cryogenic tanks 10 include, but are not limited to, locations within a corresponding wing 210 of the airframe 204.

FIG. 7 is a perspective view of another exemplary alternative embodiment of a reinforcement frame 314 that may be used with the cryogenic tank 10 (shown in. FIGS. 1-3) in place of the reinforcement frame 14 (shown in FIGS. 2 and 3). The reinforcement frame 314 extends within the internal volume 20 of the shell 12. The shell 12 has been partially broken away in FIG. 7 for clarity.

The reinforcement frame 314 includes a web of elongate frame members 340 that extend along the interior side 16 of the shell 12. For example, the reinforcement frame 314 may include a web of the longitudinal and/or latitudinal frame members 40a and 40b (shown in FIGS. 2 and 3), respectively, in a substantially similar manner to the reinforcement frame 14. In addition to the longitudinal and/or latitudinal frame members, the reinforcement frame 314 includes one or more dumbbell-shaped structures 386. As will be described below, the dumbbell-shaped structures 386 are directly or indirectly attached to longitudinal and/or latitudinal frame members of the reinforcement frame 314.

Each dumbbell-shaped structure 386 includes a base segment 388 that extends a length from an end 390 to an opposite end 392. An enlarged end structure 394 extends at each end 390 and 392. Although shown as having a spherical shape, each enlarged end structure 394 may include any other shape that enables a reinforcement frame to function as described and/or illustrated herein. In some embodiments, a dumbbell-shaped structure 386 is non-symmetrical about a plane 396 that extends approximately parallel to the central longitudinal axes 26 of the partial cylinders 24 (e.g., extends approximately perpendicular to a direction of flight). Such non-symmetry about the plane 396 may facilitate preventing the shell 12 from rupturing when experiencing inertia loads that are exerted on the shell 12 non-symmetrically relative to the plane 396.

In the exemplary embodiment of the reinforcement frame 314, the frame members 340 of the reinforcement frame 314 include latitudinal frame members 340b. Lengths of the latitudinal frame members 340b peripherally surround the central longitudinal axes 26 of the partial cylinders 24. Although not shown, the frame members 340 of the reinforcement frame 314 may include longitudinal frame members (not shown), for example substantially similar to the longitudinal frame members 40a (shown in FIGS. 2 and 3). The latitudinal frame members 340b may be referred to herein as "latitudinal cylinder frame members". Any longitudinal frame members of the reinforcement frame 314 may be referred to herein as "longitudinal cylinder frame members".

In the exemplary embodiment of the reinforcement frame 314, the enlarged end structures 394 of the dumbbell-shaped structures 386 are directly and/or indirectly attached to corresponding latitudinal frame members 340b. In some embodiments, the enlarged end structures 394 are also directly and/or indirectly attached to the interior side 16 of the shell 12. As described above with respect to the reinforcement frame 14, the latitudinal frame members 340b and/or any longitudinal frame members may be directly and/or indirectly attached to the interior side 16 of the shell 12. The enlarged end structures 394 may be directly and/or indirectly attached to the latitudinal frame members 340b and/or the shell 12 using any suitable attachment structure and/or means, such as, but not limited to, by welding, using an adhesive, and/or the like. The reinforcement frame 314 may include any number of the dumbbell-shaped structures 386. In embodiments wherein the reinforcement frame 314 includes longitudinal frame members, the enlarged end structures 394 of the dumbbell-shaped structures 386 are optionally directly and/or indirectly attached to corresponding longitudinal frame members of the reinforcement frame 314.

The internal reinforcement frame 314 is configured to reinforce the shell 12 by distributing loads exerted on the shell 12 along three orthogonal directions. Inertia loads exerted on the shell 12 are distributed along the web pattern of the reinforcement frame 314, including along the dumbbell-shaped structures 386. The inertia loads exerted on the shell 12 are thereby distributed along the x, y, and z directions of the Cartesian coordinate system. Accordingly, instead of being localized at a region or point of the shell 12, the inertia loads exerted on the shell 12 by the cryogenic fluid are spread out along the pattern of the reinforcement frame 314. The distribution of the inertia loads by the reinforcement frame 314 may prevent the shell 12 from rupturing when the inertia loads are exerted thereon, which may prevent the cryogenic fluid from spilling out of the cryogenic tank 10. For example, the distribution of the inertia loads by the reinforcement frame 314 may prevent the shell 12 from rupturing when experiencing pressure induced by inertia loading of up to or greater than approximately 50 pounds per square inch. Moreover, and for example, the distribution of the inertia by the reinforcement frame 314 may prevent the shell 12 from rupturing when experiencing inertia loads resulting from accelerations up to or greater than approximately nine times gravitational acceleration.

In embodiments wherein the reinforcement frame 314 is aligned with (e.g., attached to) the support feet 50, the inertia loads exerted on the shell 12 are distributed by the reinforcement frame 314 to the support feet 50, and ultimately to the support surface 52 (shown in FIGS. 1-3) that supports the cryogenic tank 10. Such distribution of loads to the internal bulkhead(s), the support feet 50, and/or the support surface 52 may provide the shell 12 with the capability of withstanding greater inertia loads without rupturing.

The pattern of the web of the reinforcement frame 314, including the size, shape, location, and/or the like of the dumbbell-shaped structures 386, may be selected to prevent the shell 12 from rupturing when experiencing inertia loads up to or greater than a predetermined amount. Moreover, the pattern of the web of the reinforcement frame 314, including the size, shape, location, and/or the like of the dumbbell-shaped structures 386, may be selected to provide the cryogenic tank 10 with a predetermined mass efficiency and/or may be selected to provide the cryogenic tank 10 with a relatively light weight while also being relatively structurally robust. For example, the pattern of the web of the reinforcement frame 314, including the size, shape, location, and/or the like of the dumbbell-shaped structures 386, may be selected to provide the cryogenic tank 10 with the lightest weight that still enables the shell 12 and the various other components of the cryogenic tank 10 to be structurally robust to loads encountered on-board an aircraft during operation of the aircraft, for example flight operations, emergency landing operations, and emergency takeoff operations.

The various embodiments described and/or illustrated herein may provide a cryogenic tank that is relatively lightweight, relatively volume efficient, and structurally robust to loads encountered during operation of an aircraft. For example, the various embodiments described and/or illustrated herein may provide a cryogenic tank that is relatively lightweight, relatively volume efficient, and capable of withstanding inertia loads up to or greater than a predetermined value without rupturing and/or becoming dislodged within the aircraft. As described above, various parameters of the cryogenic tanks described and/or illustrated herein may be selected to provide the cryogenic tank with a predetermined volume efficiency and/or to increase the volume efficiency of a cryogenic tank that is structurally robust to loads encountered during operation of an aircraft. Examples of volume efficiencies of the various embodiments of cryogenic tanks described and/or illustrated herein include, but are not limited to, greater than approximately 50%, between approximately 50% and approximately 70%, greater than approximately 57%, greater than approximately 60%, and/or the like. Various parameters of the cryogenic tanks described and/or illustrated herein may be selected to provide the cryogenic tank with a predetermined mass efficiency and/or to increase the mass efficiency of a cryogenic tank that is structurally robust to loads encountered during operation of an aircraft. Examples of mass efficiencies of the various embodiments of cryogenic tanks described and/or illustrated herein include, but are not limited to, greater than approximately 6.0 Gal/lbm, between approximately 6.25 Gal/lbm and 7.75 Gal/lbm, between approximately 6.0 Gal/lbm and 8.0 Gal/lbm, greater than approximately 7.5 Gal/lbm, and/or the like.

The embodiments of cryogenic tanks described and/or illustrated herein may be more volume efficient than spherical or cylindrical cryogenic tanks. For example, FIG. 8 illustrates cryogenic tanks 500 and 600, the cryogenic tank 10, and the cryogenic tank 310 each residing within the irregular space 222 of the aircraft 200. Specifically, FIG. 8a illustrates a spherical cryogenic tank 500 contained within the irregular space 222, and FIG. 8b illustrates a cylindrical cryogenic tank 600 contained within the irregular space 222. Similar to FIG. 6, FIG. 8c illustrates the cryogenic tank 10 contained within the irregular space 222. FIG. 8d illustrates the cryogenic tank 310 contained within the irregular space 222. The cryogenic tank 310 includes a shell 312 that has four lobes 322a-d.

As should be apparent from FIG. 8, the multi-lobe shape of each of the cryogenic tanks 10 and 310 is more volume efficient than the spherical and cylindrical shapes of the respective cryogenic tanks 500 and 600. Specifically, the ratio of the volume capacity of the internal volume 20 of the cryogenic tank 10 divided by the amount of the irregular space 222 that is filled by the cryogenic tank 10 is greater than the same ratio of each of the cryogenic tanks 500 and 600. Similarly, the ratio of the volume capacity of an internal volume 320 of the cryogenic tank 310 divided by the amount of the irregular space 222 that is filled by the cryogenic tank 310 is greater than the same ratio of each of the cryogenic tanks 500 and 600. The greater volume efficiency of the cryogenic tanks 10 and 310 may enable the aircraft 200 to carry a fewer number of fuel tanks for a given total amount of fuel carried by the aircraft 200.

As described above, the number of lobes of the multi-lobe shape of the various embodiments of cryogenic tanks described and/or illustrated herein may be selected to provide the cryogenic tank with a predetermined volume efficiency and/or with a predetermined mass efficiency. As the number of lobes increases, the volume efficiency of the cryogenic tank generally increases. But, the mass efficiency of the cryogenic tank will generally decrease as the number of lobes increases. It should be understood that the number of lobes may be selected to balance the mass efficiency and the volume efficiency of the cryogenic tank for the specific application of the cryogenic tank.

The various embodiments of cryogenic tanks are described and illustrated herein with respect to being used as a fuel tank on-board an aircraft for containing LNG that is used as fuel for an engine of the aircraft. But, the various embodiments of cryogenic tanks are not limited to being used with aircraft, are not limited to being used as a fuel tank, and are not limited to containing LNG. Rather, the various embodiments of cryogenic tanks may be used to contain any cryogenic fluid that is intended to be used for any application, and may be located on any other stationary and/or mobile platform, such as, but not limited to, buildings, facilities, surface lots, support surfaces (e.g., a floor, the ground, a concrete patch, an asphalt patch, a wooden and/or metal platform, and/or the like), trains, automobiles, watercraft (e.g., a ship, a boat, a maritime vessel, and/or the like), and/or the like. Additionally, the various embodiments of cryogenic tanks are described and illustrated herein with respect to a fixed wing airplane. But, the various embodiments of cryogenic tanks are not limited to airplanes or fixed wing aircraft. Rather, the various embodiments of cryogenic tanks may be implemented within other types of aircraft having any other design, structure, configuration, arrangement, and/or the like, such as, but not limited to, aerostats, powered lift aircraft, and/or rotorcraft, among others.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A cryogenic tank for containing cryogenic fluid therein, the cryogenic tank comprising:
a shell having an interior side, an exterior side, and an internal volume that is bounded by the interior side, the shell being configured to contain the cryogenic fluid within the internal volume, the shell having a shape that includes at least two elongated lobes that are defined by partial cylinders that intersect each other, the partial cylinders of the at least two lobes extending lengths along central longitudinal axes that are offset from each other, the at least two lobes comprising opposite domes that extend at opposite ends of the length of the corresponding partial cylinder; and
an internal reinforcement frame comprising a web of elongate frame members that extend within the internal volume of the shell, the frame members extending along the interior side of the shell such that lengths of the frame members extend along paths that follow the profile of the interior side of the shell, wherein the internal reinforcement frame is configured to distribute loads exerted on the shell along at least three different directions, wherein the frame members of the reinforcement frame comprise formers and stringers, the lengths of the formers peripherally surrounding the central longitudinal axes of the partial cylinders, the lengths of the stringers extending along the central longitudinal axes of the partial cylinders, the stringers and formers overlapping each other, wherein the shell has a volume efficiency of at least approximately 57% and the internal reinforcement frame have a mass efficiency of between approximately 6.25 Gal/lbm and 7.15 Gal/lbm.

2. A cryogenic tank for containing a cryogenic fluid therein, the cryogenic tank comprising:
a shell having an interior side, an exterior side, and an internal volume that is bounded by the interior side, the shell being configured to contain the cryogenic fluid within the internal volume, the shell having a shape that includes at least two elongated lobes that are defined by partial cylinders that intersect each other, the partial cylinders of the at least two lobes extending lengths along central longitudinal axes that are offset from each other, the at least two lobes comprising opposite domes that extend at opposite ends of the length of the corresponding partial cylinder; and
an internal reinforcement frame comprising a web of elongate frame members that extend within the internal volume of the shell, the frame members extending along the interior side of the shell such that lengths of the frame members extend along paths that follow the profile of the interior side of the shell, wherein the internal reinforcement frame is configured to distribute loads exerted on the shell along at least three different directions, wherein the frame members of the reinforcement frame comprise a latitudinal frame member and a dumbbell-shaped structure that is at least one of directly or indirectly attached to the latitudinal frame member, wherein the shell has a volume efficiency of at least approximately 57% and the internal reinforcement frame have a mass efficiency of between approximately 6.25 Gal/lbm and 7.75 Gal/lbm.

3. A cryogenic tank for containing a cryogenic fluid therein, the cryogenic tank comprising:
a shell having an interior side, an exterior side, and an internal volume that is bounded by the interior side, the shell being configured to contain the cryogenic fluid within the internal volume, the shell having a shape that includes at least two elongated lobes that are defined by partial cylinders that intersect each other, the partial cylinders of the at least two lobes extending lengths along central longitudinal axes that are offset from each other, the at least two lobes comprising opposite domes that extend at opposite ends of the length of the corresponding partial cylinder; and
an internal reinforcement frame comprising a web of elongate frame members that extend within the internal volume of the shell, the frame members extending along the interior side of the shell such that lengths of the frame members extend along paths that follow the profile of the interior side of the shell, wherein the internal reinforcement frame is configured to distribute loads exerted on the shell along at least three different directions, wherein the frame members of the reinforcement frame comprise longitudinal frame members and latitudinal frame members, the lengths of the longitudinal frame members extending along the central longitudinal axes of the partial cylinders, the lengths of the latitudinal frame members peripherally surrounding the central longitudinal axes of the partial cylinders, wherein the shell has a volume efficiency of at least approximately 57% and the internal reinforcement frame have a mass efficiency of between approximately 6.25 Gal/lbm and 7.75Gal/lbm.

4. The cryogenic tank of claim 3, further comprising a support foot attached to at least one of the shell or the internal reinforcement frame, the support foot being configured to support the cryogenic tank on a support surface.

5. The cryogenic tank of claim 3, further comprising a support foot extending outward on the exterior side of the shell for supporting the cryogenic tank on a support surface, the support foot extending from a support end that is configured to engage the support surface and an opposite tank end, the tank end being aligned with a joint between at least two frame members of the internal reinforcement frame such that the support foot provides support at the joint.

6. The cryogenic tank of claim 3, further comprising an internal bulkhead contained within the internal volume of the shell, the internal bulkhead extending across the internal volume between the at least two lobes.

7. An aircraft comprising:
an airframe;
a cryogenic tank according to claim 3 on-board the airframe for containing a cryogenic fluid.

8. The aircraft of claim 7, wherein the cryogenic tank is a fuel tank of the aircraft and the cryogenic fluid is a fuel for an engine of the aircraft.

9. The aircraft of claim 7, wherein the internal reinforcement frame is configured to provide the cryogenic tank with the capability of withstanding loads arising from an acceleration with a magnitude of approximately nine times gravitational acceleration without at least one of rupturing the shell or dislodging the cryogenic tank from a support member of the aircraft to which the cryogenic tank is secured.

10. The aircraft of claim 7, wherein the cryogenic tank in not integral with the airframe of the aircraft.

11. The aircraft of claim 7, wherein at least some of the frame members of the internal reinforcement frame are at least one of directly or indirectly attached to the interior side of the shell.

12. The aircraft of claim 7, wherein the frame members of the reinforcement frame comprise longitudinal frame members and latitudinal frame members, the lengths of the longitudinal frame members extending along the central longitudinal axes of the partial cylinders, the lengths of the latitudinal frame members peripherally surrounding the central longitudinal axes of the partial cylinders.

13. The aircraft of claim 7, wherein the frame members of the reinforcement frame comprise formers and stringers, the lengths of the formers peripherally surrounding the central longitudinal axes of the partial cylinders, the lengths of the stringers extending along the central longitudinal axes of the partial cylinders, the stringers and formers overlapping each other.

14. The aircraft of claim 7, wherein the frame members of the reinforcement frame intersect each other at approximately perpendicular angles.

15. The aircraft of claim 7, wherein the airframe extends a length along a central longitudinal axis and the cryogenic tank extends a length along a central longitudinal axis that extends approximately perpendicular to the central longitudinal axis of the airframe.

16. The aircraft of claim 7, further comprising a pallet on-board the airframe, the cryogenic tank being secured to the pallet.

17. The aircraft of claim 7, further comprising a pallet on-board the airframe, the cryogenic tank comprising a support foot extending outward on the exterior side of the shell for supporting the cryogenic tank on the pallet, the support foot extending from a support end that is configured to engage the pallet and an opposite tank end, the tank end being aligned with a joint between at least two frame members of the internal reinforcement frame such that the support foot provides support at the joint.

18. The aircraft of claim 7, wherein the cryogenic tank further comprises an internal bulkhead contained within the internal volume of the shell, the internal bulkhead extending across the internal volume between the at least two lobes.

19. The cryogenic tank of claim 3, wherein the longitudinal frame members comprise longitudinal cylinder frame members, the latitudinal frame members comprising latitudinal cylinder frame members, and the frame members further comprise dome frame members, the lengths of the longitudinal cylinder frame members extending approximately parallel to the central longitudinal axes of the partial cylinders, the lengths of the latitudinal cylinder frame members peripherally surrounding the central longitudinal axes of the partial cylinders, the lengths of the dome frame members extending along the interior side of the shell at corresponding domes.

20. The cryogenic tank of claim 3, wherein at least some of the frame members of the internal reinforcement frame are at least one of directly or indirectly attached to the interior side of the shell.

21. The cryogenic tank of claim 3, wherein the frame members of the reinforcement frame have circular cross-sectional shapes.

22. The cryogenic tank of claim 3, wherein the frame members of the reinforcement frame intersect each other at approximately perpendicular angles.

* * * * *